(12) United States Patent
Kim et al.

(10) Patent No.: US 11,000,126 B1
(45) Date of Patent: May 11, 2021

(54) SMART WALL

(71) Applicant: LG ELECTRONICS INC., Seoul (KR)

(72) Inventors: Yunjoo Kim, Seoul (KR); Kisang Jung, Seoul (KR); Jaemyo Shim, Seoul (KR); Hyunki Kim, Seoul (KR); Juyoung Choi, Seoul (KR); Hwasuk Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/740,345

(22) Filed: Jan. 10, 2020

Related U.S. Application Data

(63) Continuation of application No. PCT/KR2019/016031, filed on Nov. 21, 2019.

(51) Int. Cl.
*G09B 5/06* (2006.01)
*H04R 1/02* (2006.01)
(Continued)

(52) U.S. Cl.
CPC ............ *A47B 97/001* (2013.01); *A47B 81/06* (2013.01); *E04B 2/28* (2013.01)

(58) Field of Classification Search
CPC ......... E04B 2/28; E04B 2/827; A47B 46/005; A47B 51/00; A47B 97/001; A47B 81/06;
(Continued)

(56) References Cited

U.S. PATENT DOCUMENTS

| 5,052,459 A | 10/1991 | Grossenbacher |
| 5,067,287 A * | 11/1991 | Lewis ................ G09F 15/0006 52/29 |

(Continued)

FOREIGN PATENT DOCUMENTS

| CN | 207905172 | 9/2018 |
| CN | 208905463 | 5/2019 |

(Continued)

OTHER PUBLICATIONS

European Patent Office Application Serial No. 20157133.8, Search Report dated Jun. 25, 2020, 7 pages.

(Continued)

*Primary Examiner* — Brent W Herring
*Assistant Examiner* — James J Buckle, Jr.
(74) *Attorney, Agent, or Firm* — Lee, Hong, Degerman, Kang & Waimey

(57) ABSTRACT

Disclosed herein is a smart wall including a frame structure including a mounting cell, an electronic appliance disposed in the mounting cell, a first moving art wall positioned in front of the mounting cell and configured to move in a thickness direction, a second moving art wall positioned in front of the mounting cell and configured to move in a vertical direction, a horizontal driver configured to drive the first moving art wall, and a vertical driver configured to drive the second moving art wall. The smart wall may be equipped with multimedia devices, such as a display device and an audio devices, and household appliances, such as an air cleaner and a humidifier, on a wall, thereby minimizing the exposure of the home appliances.

12 Claims, 16 Drawing Sheets

(51) Int. Cl.
  *H05K 7/18* (2006.01)
  *G06F 1/16* (2006.01)
  *A47B 97/00* (2006.01)
  *E04B 2/28* (2006.01)
  *A47B 81/06* (2006.01)

(58) Field of Classification Search
  CPC ... A47B 81/061; A47B 81/062; A47B 81/064; G06F 1/16; G06F 1/1601; H04N 5/64; H04N 5/645; H05K 7/18; H05K 7/1488; G09G 2300/04; G09G 2300/023; G09G 2300/026
  USPC ......... 52/29, 27; 361/724; 312/7.2; 348/836, 348/839, 841
  See application file for complete search history.

(56) References Cited

U.S. PATENT DOCUMENTS

| | | | | |
|---|---|---|---|---|
| 7,410,226 | B1* | 8/2008 | Meskan | A47B 81/064 248/132 |
| 8,327,589 | B2* | 12/2012 | Sutton | E04F 19/08 52/29 |
| 8,474,193 | B2* | 7/2013 | Sutton | A47B 46/005 52/29 |
| 8,713,857 | B2* | 5/2014 | Logue | A47G 5/00 52/36.6 |
| 8,970,795 | B2* | 3/2015 | Lemieux | F16M 13/02 348/836 |
| 9,273,473 | B2* | 3/2016 | Millson | H04N 5/64 |
| 10,435,885 | B2* | 10/2019 | Piethman | E04C 2/46 |
| 10,874,028 | B2* | 12/2020 | Joo | H04R 1/025 |
| 2002/0084727 | A1* | 7/2002 | Miller | A47B 96/00 312/205 |
| 2004/0035060 | A1* | 2/2004 | Miyazaki | A47B 53/02 52/29 |
| 2004/0135476 | A1* | 7/2004 | Gillengerten | H04R 5/02 312/8.16 |
| 2004/0222721 | A1* | 11/2004 | Kelley | A47B 81/06 312/205 |
| 2005/0133231 | A1* | 6/2005 | Conerton | A47B 81/06 174/17 VA |
| 2007/0170823 | A1* | 7/2007 | Stannis | A47B 81/06 312/7.2 |
| 2010/0215205 | A1* | 8/2010 | Nagao | H04R 1/26 381/388 |
| 2011/0304781 | A1 | 12/2011 | Rowell | |
| 2013/0104462 | A1* | 5/2013 | Johnson | E04H 3/02 52/29 |
| 2014/0137485 | A1* | 5/2014 | Lafferty, III | E04B 7/04 52/29 |
| 2014/0368096 | A1* | 12/2014 | Pachmayr | A47B 46/005 312/7.2 |
| 2015/0033642 | A1* | 2/2015 | Johnson | E04F 19/08 52/173.1 |
| 2015/0033994 | A1* | 2/2015 | Popwell | E05G 1/10 109/43 |
| 2016/0173809 | A1 | 6/2016 | Millson et al. | |

FOREIGN PATENT DOCUMENTS

| | | |
|---|---|---|
| EP | 1961884 | 8/2008 |
| JP | H06123919 | 5/1994 |
| JP | 2002147148 | 5/2002 |
| JP | 2002155686 | 5/2002 |
| KR | 101422412 | 7/2014 |

OTHER PUBLICATIONS

PCT International Application No. PCT/KR2019/016031, International Search Report dated Aug. 13, 2020, 10 pages.
Korean Intellectual Property Office Application No. 10-2020-0000936, Office Action dated Dec. 24, 2020, 4 pages.

* cited by examiner (a)

(b)

(c)

(a)

(b)

(c)

(a)

(b)

(a)

(b)

(a)

(b)

SMART WALL

This application is a continuation of International Application No. PCT/KR2019/016031, filed on Nov. 21, 2019, the contents of which are all hereby incorporated by reference herein in its entirety.

BACKGROUND

Field

The present disclosure relates to a wall on which a multimedia device, such as a TV and a loudspeaker, and a home appliance are mounted, and a unitized smart wall.

Discussion of the Related Art

Recently, as the infrastructure in which all media devices and home appliances at home beyond the smartphone are connected to the Internet is built, the smart home is emerging as a keyword of a new smart ecosystem. In particular, user experiences and values accumulated through smartphones, which are personal media devices, have begun to extend to other devices.

As various attempts such as building a home network system were made in order to make media devices and home appliances to interoperate with each other, the number of electronic devices at home has increased and there is a hassle of connecting the devices one by one.

In particular, it is a recent trend to minimize the number of pieces of furniture and electronics that are placed near the living room wall, around which the TV is usually placed, to keep a neat appearance of the living room wall, which represents the house. In addition, where there are children in a house, they may be pushed over or bumped and injured due to a TV table or a loudspeaker placed in the living room. Therefore, it is important to reduce the number of pieces of furniture and electronics protruding into the space of the living room.

In order to minimize the number of pieces of furniture exposed to the outside, a screen to cover the front of a device occupying a large area such as a TV may be used to cover the device when the device is not in use. The screen may be optionally formed of a flexible material so as to be placed on the front of the TV, but a structure to maintain the screen in a flat position may be needed to allow the screen to have an appearance similar to that of the art wall therearound to provide a unified appearance.

SUMMARY OF THE DISCLOSURE

The present disclosure is directed to a wall on which multimedia devices, such as a TV and a loudspeaker, and home appliances are mounted, and an object of the present disclosure is to provide a structure for supporting a screen located on the front of a unitized smart wall.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one aspect of the present disclosure, a smart wall may include a frame structure including a mounting cell, an electronic appliance disposed in the mounting cell, a first moving art wall positioned in front of the mounting cell and configured to move in a thickness direction, a second moving art wall positioned in front of the mounting cell and configured to move in a vertical direction, a horizontal driver configured to drive the first moving art wall, and a vertical driver configured to drive the second moving art wall.

The horizontal driver and the vertical driver may be disposed in pairs on left and right sides of the frame structure, wherein the horizontal driver may be arranged at a shorter distance from a center of the frame structure than the vertical driver.

The first moving art wall may include a first art wall panel arranged in front of the frame structure so as to be exposed, and a first moving frame coupled to a rear surface of the first art wall panel and configured to transmit force of the horizontal driver.

The horizontal driver may include a first motor fixed to the frame structure, a pinion gear configured to be rotated by rotational force of the first motor transmitted thereto, a rack gear configured to move horizontally according to rotation of the pinion gear, and a first fastening bracket configured to connect the first moving frame and the rack gear to each other.

The smart wall may further include a guide frame extending in a rear direction of the first moving frame, a guide slot formed in the guide frame and extending in a front-back direction, and a guide pole fixed to the frame structure and inserted into the guide slot, wherein, when the first moving art wall moves in a back-and-forth direction, a position of the guide pole may be changed in the guide slot.

The guide frame may include a plurality of guide frames arranged in a horizontal direction of the first moving art wall, wherein the guide pole may extend in a horizontal direction to pass through the guide slots formed in the plurality of guide frames.

The guide slot and the guide pole may include a plurality of guide slots and guide poles arranged in a vertical direction on the guide frame.

The second moving art wall may include a second art wall panel arranged in front of the frame structure so as to be exposed, and a second moving frame coupled to a rear surface of the second art wall panel and configured to transmit force of the vertical driver.

The vertical driver may include a pair of rotating pulleys coupled to the frame structure and disposed in a vertical direction, a second motor configured to provide rotational force to the pair of rotational pulleys, a timing belt having a closed curved surface surrounding the pair of rotating pulleys, and a second fastening bracket configured to connect the second moving frame and the timing belt.

The smart wall may further include a guide rail disposed adjacent to the timing belt and extending in a vertical direction, and a guide roller protruding from the second fastening bracket and fastened to the guide rail so as to move in the vertical direction.

The first moving art wall may be moved by a distance greater than or equal to a thickness of the second moving art wall.

The smart wall may further include a controller configured to drive the second moving art wall after completion of driving of the first moving art wall when a driving signal is input, wherein the electronic appliance may include a display device, wherein the controller changes a size and content of an image output to the display device according to a position of the second moving art wall.

The smart wall may be equipped with multimedia devices, such as a display device and an audio devices, and household appliances, such as an air cleaner and a humidifier, on a wall, thereby minimizing the exposure of the home appliances.

In addition, a device occupying a large area such as a display device may be selectively opened as needed. Thereby, a tidier appearance may be provided.

An art wall to cover the display device may provide the same appearance as the other art walls, and accordingly may provide a unified appearance even when partially opened.

Further scope of applicability of the present disclosure will become apparent from the detailed description below. Various changes and modifications within the spirit and scope of the present disclosure may be clearly understood by those skilled in the art, and therefore, the detailed description and specific embodiments, such as preferred embodiments of the present disclosure, should be understood as given by way of example only.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Hereinafter, exemplary embodiments disclosed herein will be described in detail with reference to the accompanying drawings. The same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In the following description of the embodiments of the present disclosure, a detailed description of known technology will be omitted to avoid obscuring the subject matter of the present disclosure. The accompanying drawings are intended to facilitate understanding of the embodiments disclosed herein, and should not be construed as limiting the technical idea disclosed in the present specification. The disclosure is to cover all modifications, equivalents, and alternatives falling within the spirit and scope of the embodiments.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" include plural referents unless context clearly dictates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

Figure 1:
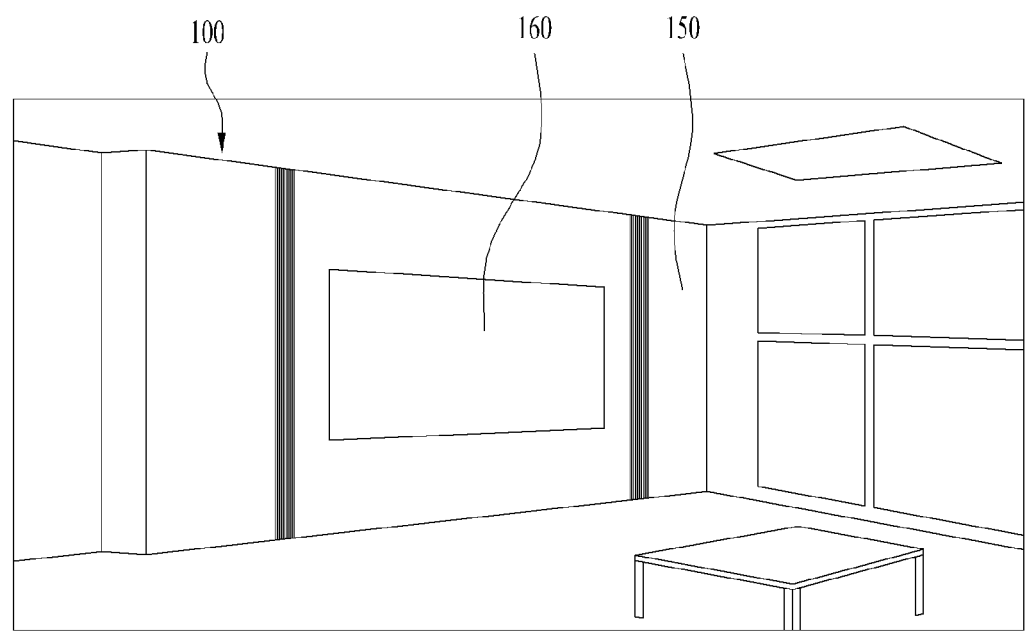
FIG. 1 is a view illustrating an installation example of a smart wall.

FIG. 1 is a view showing a wall-type frame of a media wall 100 of the present disclosure. The present disclosure relates to a media wall 100 systemized by integrating electronic devices used at home, such as media devices and home appliances, with a wall so as not to be exposed through the exterior of the media wall. The present disclosure provides a total space solution that minimizes the exposure of electronic devices in a space by mounting various electronic devices such as a display, an interphone, a loudspeaker, an air purifier, a humidifier, a light, a digital clock, a router, and a set-top box on a wall.

Recently, the thickness of a display device 161 has become thin. Thus, the media wall 100 of the present disclosure may be formed to have a the thickness of 15 to 20 cm, thereby preventing the interior space from being narrowed during installation. Rather, the storage furniture and a home appliance 160 may be embedded in the media wall 100 to provide a neat appearance. When necessary, a part of the wall may be selectively drawn out to allow a necessary home appliance to protrude from the wall, and the space where the home appliances are not embedded may be used as a mounting cell 114 for an item such as a drawer.

Recently, it has become possible to design a thin TV, and thus a thin display is implementable. Accordingly, the TV itself may serve as a cover of a frame and may be coupled to the frame to define a front appearance. An opening 153 may be formed in an art wall 151 to expose the display of the display device 161. A cover to open and close the opening 153 may be further provided.

A display employing organic light-emitting diodes (OLED) is bendable, and therefore it may be exposed to the outside only when used and may be rolled up and kept inside the wall when not in use, thereby providing a tidy screen by appearance.

Regarding projectors, a unifocal projector has recently been developed. This projector may be mounted on the wall and drawn out like a drawer to output images on a screen, thereby implementing a large screen. In this case, when the projector is in use, the display is unseeable from the outside of the media wall 100, and therefore may provide a tidier appearance.

Figure 2:
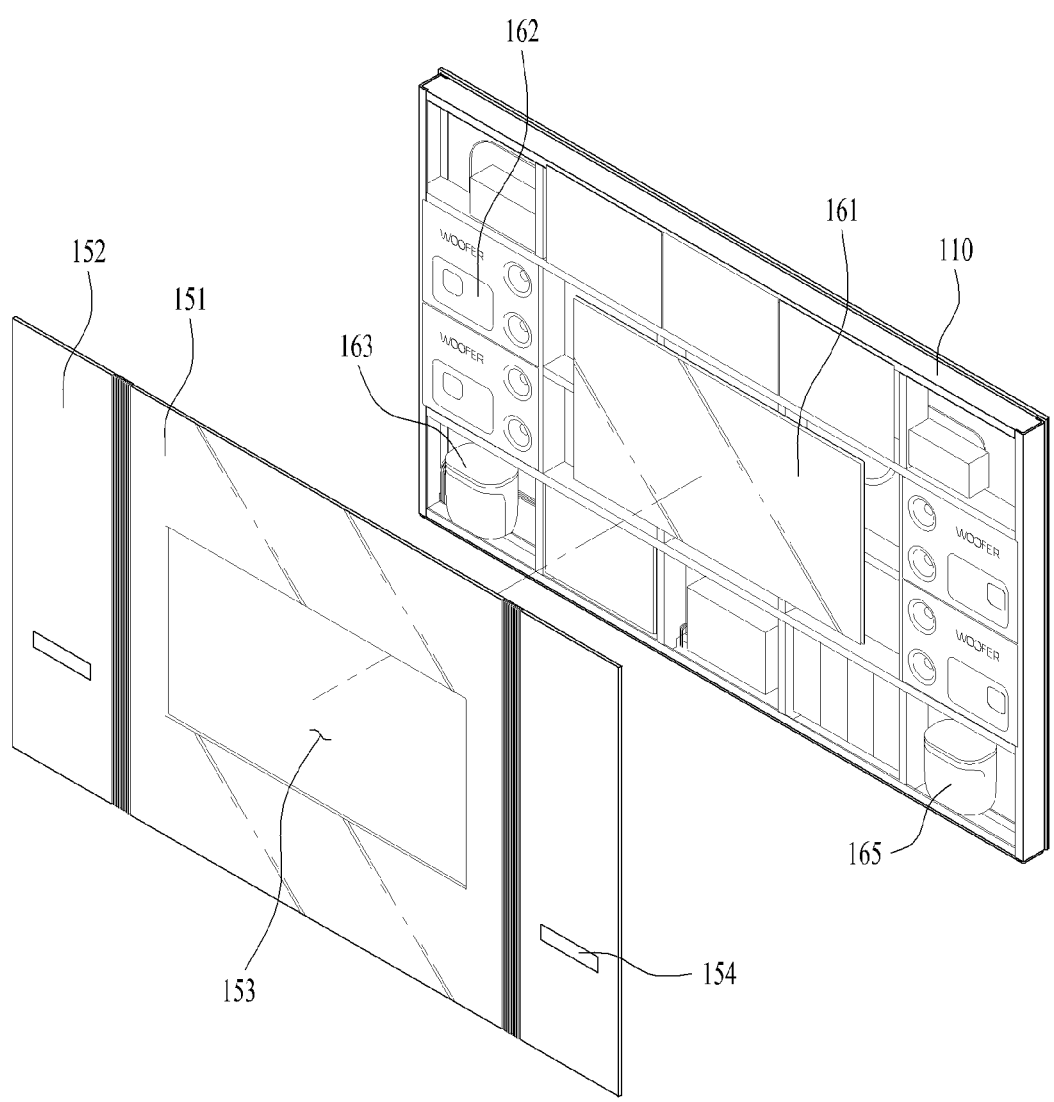
FIG. 2 is an exploded perspective view of a smart wall according to an embodiment.
Figure 3:
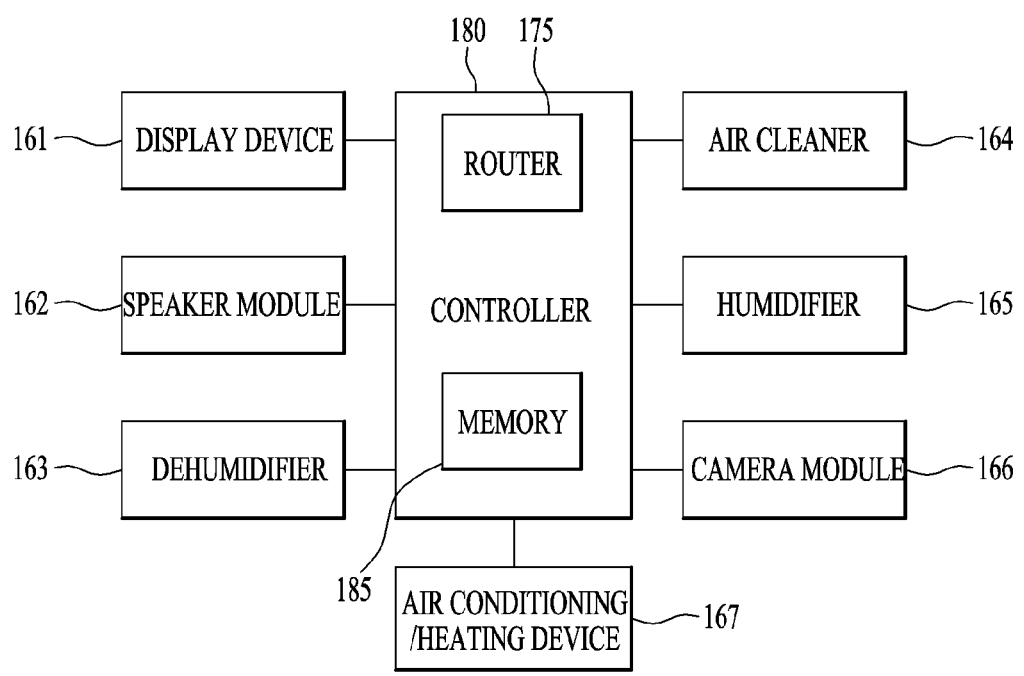
FIG. 3 is a block diagram of the smart wall according to an embodiment.

FIG. 2 is an exploded view of the media wall 100 of the present disclosure, and FIG. 3 is a block diagram of the media wall 100 according to the present disclosure. A frame structure formed by a plurality of pieces of shape steel arranged in a grid form may be disposed inside the art wall 150, which is on the front. The frame structure 110 is a rigid member. The frame structure 110 may support the wall so as not to collapse even when an impact is applied to the wall. A panel may be attached to the front of the frame structure 110 to hide the electronic appliance 160 mounted on the frame structure 110, thereby looking like a wall. The front wall covered with such a panel is called an art wall 150.

The art wall 150 may be changed according to the preference of the consumer. The art wall 150 may be easily changed after being installed to change the mood of the home.

The shape steel 115 arranged in a grid form may partition the mounting cell 114, and seat the electronic appliance 160 in each of the partitioned mounting cells 114. The partitioned mounting cells 114 may have the same size or sizes which are multiples of a size. Thus, the electronic appliance 160 to be mounted may be modularized and disposed at any position in the frame structure 110.

In addition to the display device 161 described above, a sound device 162 such as a loudspeaker may be mounted in the mounting cell 114. Multiple sound devices 162 may be configured according to the number of channels. The art wall 152 covering the sound device 162 may be configured in a mesh form to allow sound to be output, or may selectively open and close the openings through which the sound is output, such that the openings exposed to the art wall 152 are minimized. A waterproof mesh or the like may be used to prevent water from being introduced through the openings.

A dehumidifier 163, a humidifier 165, an air cleaner 164, and an air conditioning/heating device 167, such as an air conditioner or a stove, which are seasonal household appliances, may be provided. Leaving the seasonal appliances exposed to the outside when not in use may cause dust to accumulate on the appliances and undermine the appearance. Thus, the seasonal appliances are usually kept in a storage area with a cover put thereon when they are not in use. When such appliances are embedded in the media wall 100 as in the present disclosure, they may be covered with the art wall 150 so as not to be exposed to the outside in a period for which the appliances are not used. In other words, the need for a separate storage space may be eliminated.

The dehumidifier 163 or the humidifier 165 may implement a drawer type space for collecting/storing water to remove collected water or supply water. Openings 154 through which air passes are needed to discharge water or to collect moisture in the surroundings.

The openings 154 may not be necessarily formed in the art wall 150, but a gap between the art wall 150 and the frame structure 110 may be used.

The air cleaner 164 may include an openable cover configured to periodically replace a filter.

Each electronic product may be individually controlled, but the media wall may further include a controller 180 configured to integrally control the electronic appliances mounted on the media wall. The controller may have a memory 185 and thus may store collected data therein.

The dehumidifier, the humidifier, and the air cleaner 164 may be installed at a lower end of the media wall 100 to allow a user to easily manipulate the dehumidifier, the humidifier, and the air cleaner. In addition, when a set-top box or a Wi-Fi router 175 is provided, a home network system may be implemented. Not only functional units mounted on the media wall 100 but also other electronic devices such as a computer or a mobile terminal located outside the media wall 100 may be connected via the Wi-Fi router 175 for interworking. The media wall may further include a controller 180 configured to control each electronic appliance 160.

An LED or a small display panel may be arranged on an upper portion of the media wall 100 to provide a user with simple information such as weather, time, event information, or may be used as lighting. A light may be provided to the media wall 100 to obtain an interior effect.

When different communication schemes or signals are used between the devices, the router 175 serves as an intermediate device to coordinate the schemes or signals and guide a path. In addition, a functional unit mounted on the media wall 100 may be connected and controlled via the WIFI router 175, rather than being connected by wire.

The router 175 also serves to connect an external network and the internal network to each other. Accordingly, the user staying outside may control, via the router 175 connected to the external network, not only the electronic appliance 160 mounted on the media wall 100 but also other home appliances and media devices connected to the home network.

In addition, the controller 180 may control the electronic devices of the media wall 100 in operative connection with a mobile device. That is, when the mobile device is mounted on the media wall 100, media images and music on the mobile device may be output. In addition, when a video call is received through the mobile device, the controller may receive information from the mobile device by Bluetooth or Wi-Fi and output the image of the other party through the display device 161 of the media wall 100.

In addition, a wall pad connected to a camera or security system of the front door may be provided in the mounting cell 114 of the media wall 100. The wall pad embedded in the existing bearing wall is difficult to repair and replace in case of failure, and there is a difficulty in changing the location thereof. However, when the wall pad is configured in a unit form and provided in the media wall 100, maintenance thereof is easy.

The media wall 100 may be installed in a room as well as the living room. The wall between the rooms may be configured as the media wall 100 to use the media wall 100 in both directions in neighboring rooms. For example, one air conditioner or air purifier may be used in both spaces when it is arranged to be reachable in both directions. Instead of the TV and loudspeaker 162 used in the living room, a monitor and a personal computer (PC) may be mounted and used based on the purpose of the room.

Alternatively, another functional unit such as an electronic board may be mounted and used according to the age of a child.

When installed in an office, a media wall 100 equipped with functional units such as an electronic board, an air purifier, a video conference system, and a PC may be used. The electronic appliance 160 mounted on the media wall 100 is covered by the art wall 150 and thus do not require a separate exterior case.

When the media wall 100 is installed after being manufactured at a factory according to a user's installation location, large quantities of the same module may be manufactured and supplied to a hotel/resort or apartment under construction, thereby reducing defect rate and manufacturing costs.

However, it is difficult to transport the media wall 100 that has been assembled. Further, when construction of a building is completed, it is difficult to bring the media wall 100 into the building. Accordingly, when the media wall 100 is installed at the time of movement into an existing building or remodeling of the interior, the media wall 100 may be implemented by installing a frame in the building and inserting a unit module. In this case, for ease of installation and standardization, the frame structure 110 may be implemented using a plurality of module frames.

Figure 4:
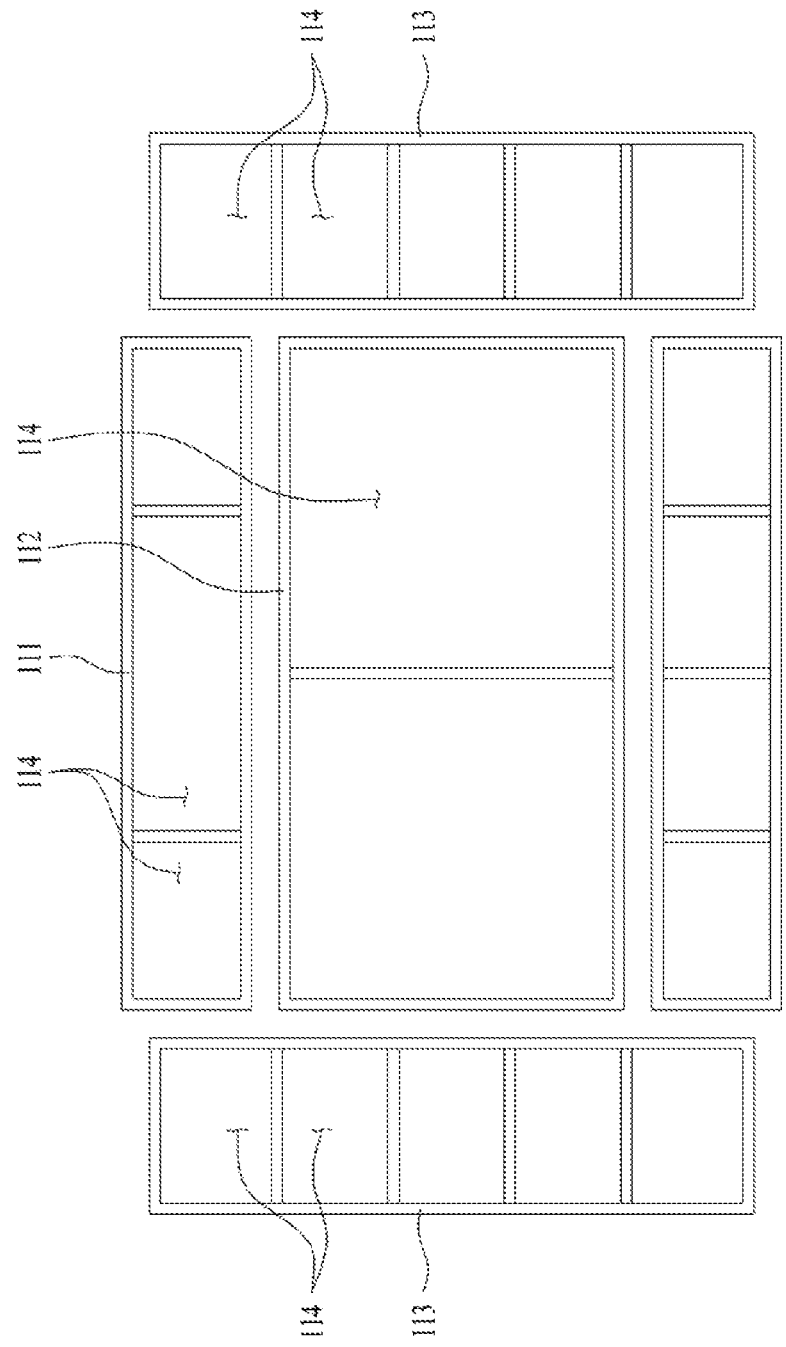
FIG. 4 is a view illustrating a configuration of frames of the smart wall according to an embodiment.

FIG. 4 is a view illustrating coupling of frame modules 111, 112, and 113 of the media wall 100 according to an embodiment of the present disclosure. In order to mount each component, bookcase-type frame modules 111, 112, and 113 including the mounting cell 114 may be used. In order to partition the mounting cell 114, the frame modules 111, 112, and 113 may be manufactured by arranging a plurality of pieces of beam-shaped shape steel 115 in a grid.

The frame modules 111, 112, and 113 may include a first frame module 111 having mounting cells 114 arranged side by side in a horizontal direction, a second frame module 112 provided to mount a large appliance 160 such as the display device 161, a third frame module 113 having mounting cells 114 arranged side by side in a vertical direction.

The second frame module 112 includes a large space to allow the display device 161 of any size to be mounted therein. When necessary, as shown in FIG. 4, beams to partition the mounting cell 114 may be provided to fix the display device 161 and to enhance rigidity of the frame structure 110.

The first frame module 111 and the second frame module 112 may be stacked in a vertical direction. The horizontal length of the first frame module 111 may be the same as the horizontal length of the second frame module 112. Thus, when the modules are stacked in the vertical direction, they may be disposed so as not to be misaligned.

The first frame module 111 may be disposed both over and under the second frame module 112. The number of first frame modules 111 stacked in the vertical direction may be increased or decreased depending on the sizes of the first frame module 111 and the second frame module 112 or the size of the installation space.

The third frame module 113, in which the mounting cells 114 are arranged side by side in the vertical direction, may have the same height as that of the first frame module 111 and the second frame module 112 stacked in the vertical direction. As shown in FIG. 4, the third frame module 113 may be located on the lateral sides of the first frame module 111 and the second frame module 112. The frame modules 111, 112, and 113 may be coupled with fasteners to form the frame structure 110 having a rectangular parallelepiped shape.

Figure 5:
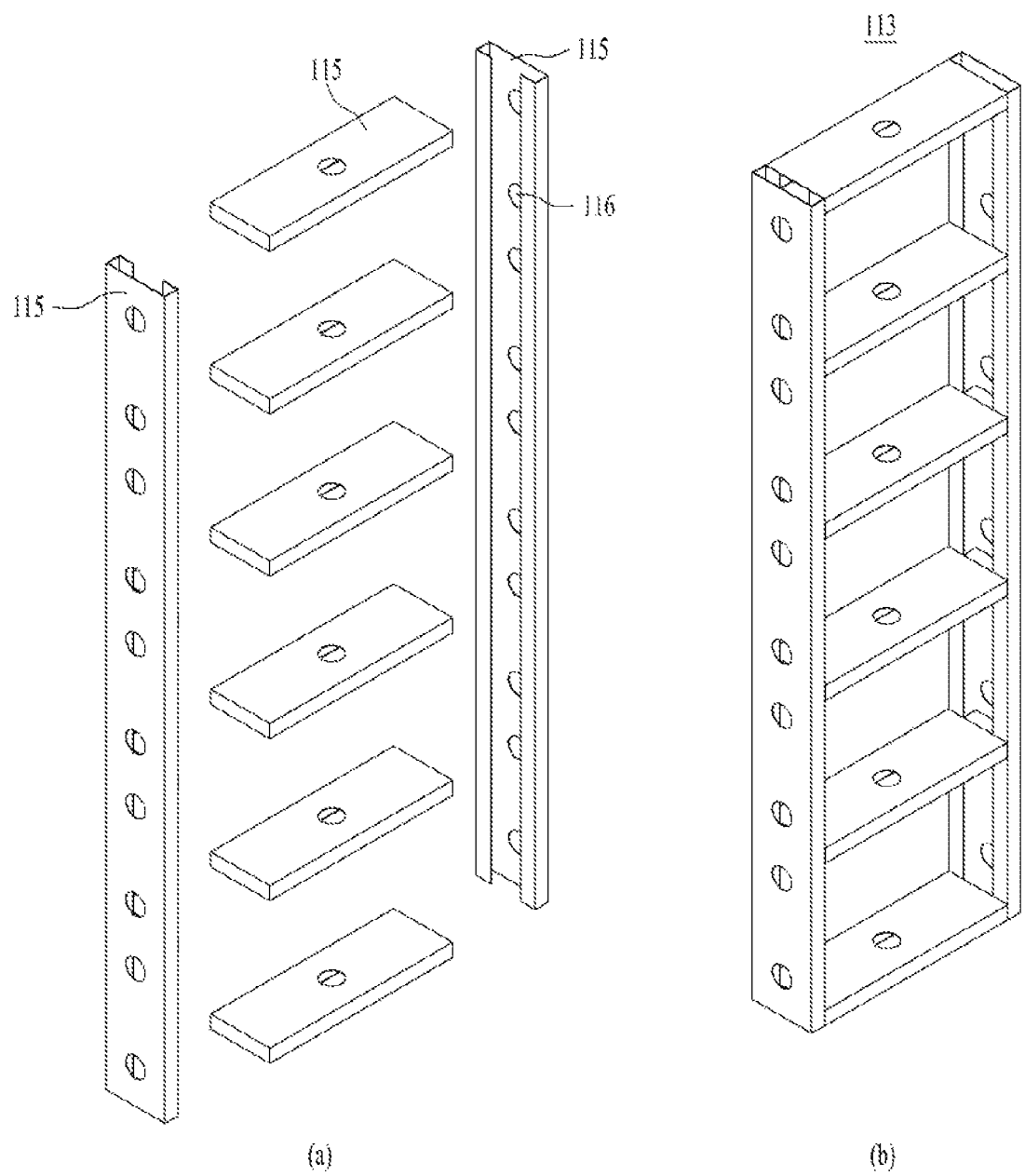
FIG. 5 shows examples of various frame structures according to a combination of frame modules.

FIG. 5 is a view illustrating a method of manufacturing the frame modules 111, 112, and 113 of the present disclosure. The third frame module 113 in which the mounting cells 114 are arranged in the vertical direction will be described as an example. Each of the frame modules 111, 112, and 113 may be formed using the shape steel 115 extending in one direction. The shape steel is a structural member and represents all rod-shaped members having various cross-sectional shapes. Rod-shaped steel having the same cross section in the longitudinal direction may be formed by rolling or by bending a sheet material. The shape steel has a hollow space compared to a beam-shaped member having a circular or rectangular cross section. Thus, it is a lightweight member obtaining rigidity greater than or equal to a predetermined value with a little amount of material.

As shown in FIG. 5, the present disclosure may employ C-shape steel 115 having a C-shaped cross section. The C-shape steel 115 may be formed by vertically bending both width ends of a metal plate. When both ends of the metal plate are vertically bent only once, the plate may have a square bracket-shaped cross section. When both ends of the metal plate are vertically bent twice, the plate may have a C-shaped cross section. A power line or signal line connected to the electronic appliance 160 may be disposed in the internal space of the steel, and an outlet module 140 to which a power cable or a data cable is fastened may be disposed.

The outlet module 140 may include a power terminal for supplying power, a data terminal for data transmission and reception such as an Internet line or a cable input, and a connector by which a functional unit inserted into the frame is connected to another functional unit. The connector has terminals on both sides of the frame. When data connection lines of electronic devices are inserted into the terminals, the devices may exchange data with each other. The outlet module 140 may include a rail structure that moves along the frame modules 111, 112, and 113.

A vent hole 116 may be formed in the shape steel 115 as shown in FIG. 5. The vent hole 116 may reduce the weight of the shape steel 115 and discharge heat generated from the electronic appliance 160. A fan may also be used to discharge hot air to the outside to more actively discharge heat. When the heat of the electronic appliance 160 is discharged into an indoor space, a heating effect may be obtained in winter. However, in summer, discharging the heat into the indoor space may cause the indoor temperature to rise. Thus, the fan may be used to internally circulate heat, or a structure to discharge heat to the outside may be added to the wiring connected to the outdoor unit of the air conditioner.

Each of the frame modules 111, 112, and 113 may include outer steel defining a rectangular outer periphery and inner steel arranged therein to partition the mounting cell 114. The outer steel may include vertical steel extending in the vertical direction and horizontal steel extending in the horizontal direction. The first frame module 111 to the third frame module 113 may be assembled by arranging the horizontal steel between a pair of vertical steels. In order to fasten the vertical steel with a fixing member 120, which is fixed to the ceiling and the floor, the upper and lower ends of the vertical steel may need to be exposed. Therefore, the vertical steel may be arranged outside the horizontal steel may be fastened by inserting vertical brackets 122 and 123 of the fixing member 120 to the end of the vertical steel.

The inner steel positioned inside the outer steel may define the mounting cell 114 by partitioning a space surrounded by the outer steel. The inner steel may be immovably connected to the outer steel by welding, and part of the inner steel may be bolted or hooked so as to be removed when necessary.

Thus, by fascinating the frame modules 111, 112, and 113 in the form of a semi-finished appliance 160 in the above-described manner, the number of connection operations to be performed on the site may be reduced. The dimensions of the appliance 160 may be kept constant and the installation time may be reduced. In addition, the product may be modularized into a size that facilitates movement of the product, and therefore may be easily moved to the site.

Figure 6:
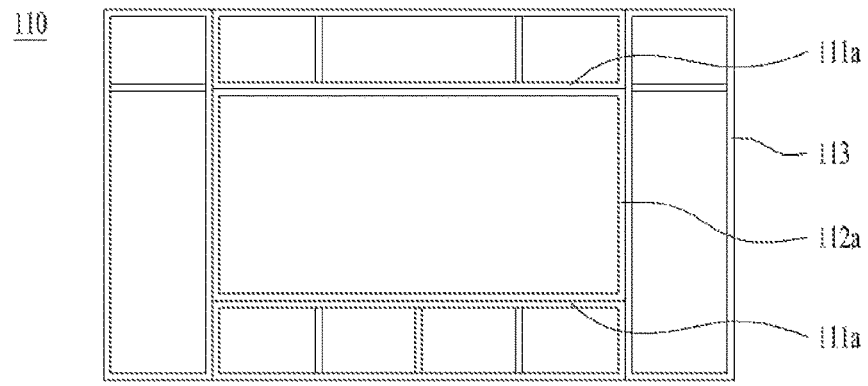
FIG. 6 is a view illustrating a frame module of the smart wall according to an embodiment.
Figure 6:
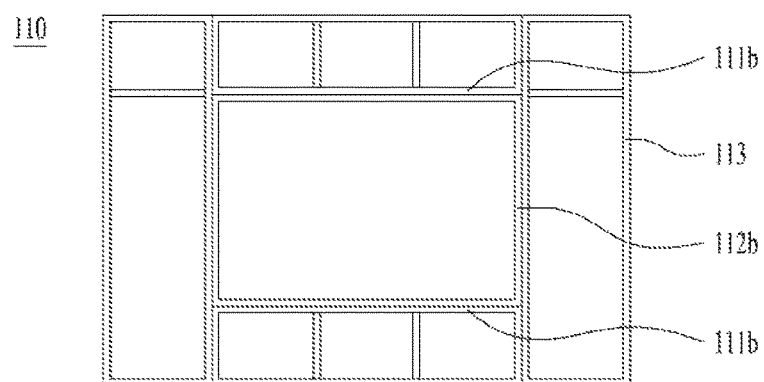
Figure 6:
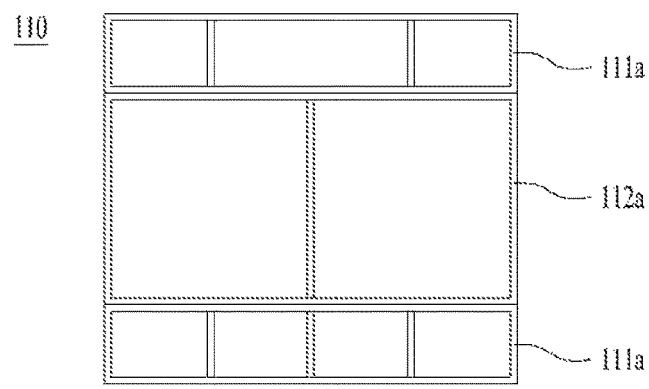

FIG. 6 shows examples of various frame structures 110 according to a combination of the frame modules 111, 112, 113 of the present disclosure. FIG. 6(a) illustrates assembly of a frame structure 110 consisting of a pair of first frame modules 111a of FIG. 4, one second frame module 112a, and a pair of third frame modules 113. Since the first frame module 111a has four mounting cells 114, the width of the first frame module 111a may not fit to a narrow indoor space for installation.

Accordingly, as shown in FIG. 6(b), a first frame module 111b having three mounting cells 114 to have a short horizontal length may be used. The second frame module 112b may have a length corresponding to the horizontal length of the first frame module 111b.

In addition, the third frame modules 113 may be disposed on both sides of the vertical stack of the first frame module 111 and the second frame module 112. The ceiling height of a typical house is 220 cm to 230 cm, the third frame module 113 may be configured to have a height a little less than 220 cm. While a five-stage vertical frame is illustrated in the drawings, a six-stage vertical frame may be manufactured in case of a multilayer house or a house having a great ceiling height.

When installed in a narrower space, the frame structure 110 may be configured using only the first frame module 111a and the second frame module 112a without the third frame module 113. When a large display device 161 is not mounted, only the third frame modules may be arranged in a line to implement the frame structure 110. Each frame module 111, 112, 113 may be fastened by bolts, or may be fastened by welding.

Figure 7:
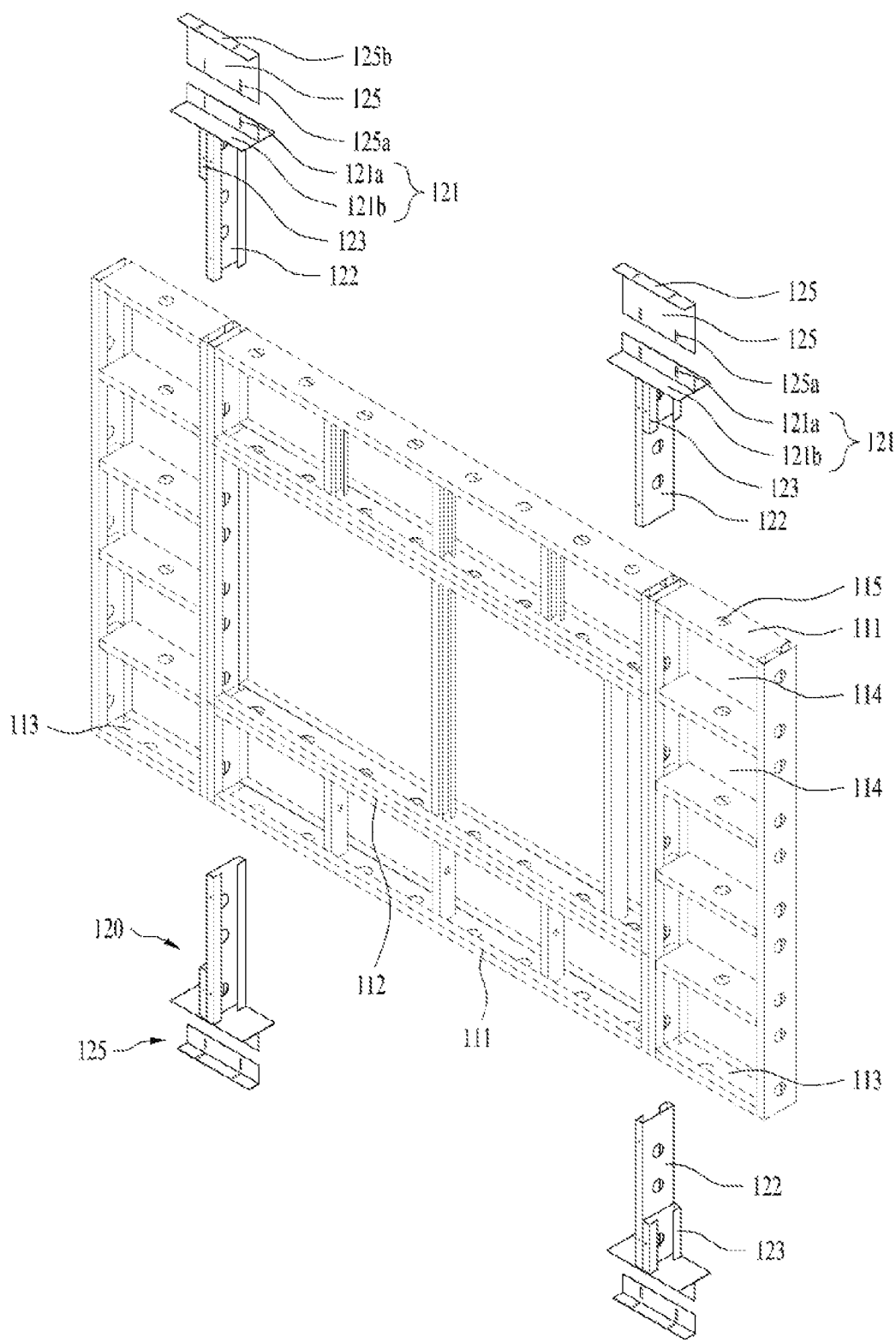
FIG. 7 is a view illustrating a method of installing a frame structure of the smart wall according to an embodiment.

FIG. 7 is a view illustrating a method of installing a frame structure 110 of the media wall 100 according to an embodiment of the present disclosure. The frame structure 110 formed by fastening the frame modules 111, 112, and 113 may be fixed to the ceiling and the floor so as to be installed in an indoor space.

The fixing bracket 125, which is installed on the ceiling or the floor, is a member bent in an L shape. One side 125b of the fixing bracket 125 is disposed on the ceiling or the floor, and the opposite side 125a thereof vertically extends from the ceiling or the floor. The frame structure may include a first vertical bracket 122 inserted into an internal space of the vertical steel thereof.

The first vertical bracket 122 may be formed to be longer than the vertical length of the first frame module 111 to fasten not only the first frame module 111 but also the second frame module 112. The frame structure may further include a second vertical bracket 123 disposed in parallel with the first vertical bracket 122 and inserted into the third frame module 113. Since the vertical steel of the third frame module 113 is one member, the vertical steel does not need to be as long as the first vertical bracket 122.

A coupling bracket 121 may be coupled to an end of each of the first vertical bracket 122 and the second vertical bracket 123 to form a T-shape together with the vertical brackets 122 and 123. The coupling bracket 121 may include a seating portion 121b coupled to the vertical brackets 122 and 123 and seated on the top surfaces of the first frame module 111 and the third frame module 113, and a fastening portion 121a vertically extending from the seating portion 121b and fastened to the fixing bracket 125. The coupling bracket 121 and the fixing bracket 125 may be fastened to each other using a screw, and may each have a fastening hole, which the screw is fastened. The fastening hole may be vertically elongated such that the brackets may be adjusted according to the ceiling height.

When the media wall 100 is installed on the existing wall, a fixing member 120 may be further provided to fasten the media wall to the existing wall.

A sound device such as the loudspeaker 162 is positioned on the media wall 100. Accordingly, when the media wall 100 is used as a temporary wall, spaces separated by the wall are formed. In this case, the media wall 100 may be fixed by adding a soundproof structure to prevent sound from leak to the two spaces through the ceiling, the floor, and the sidewalls which are in contact with the media wall 100.

Figure 8:
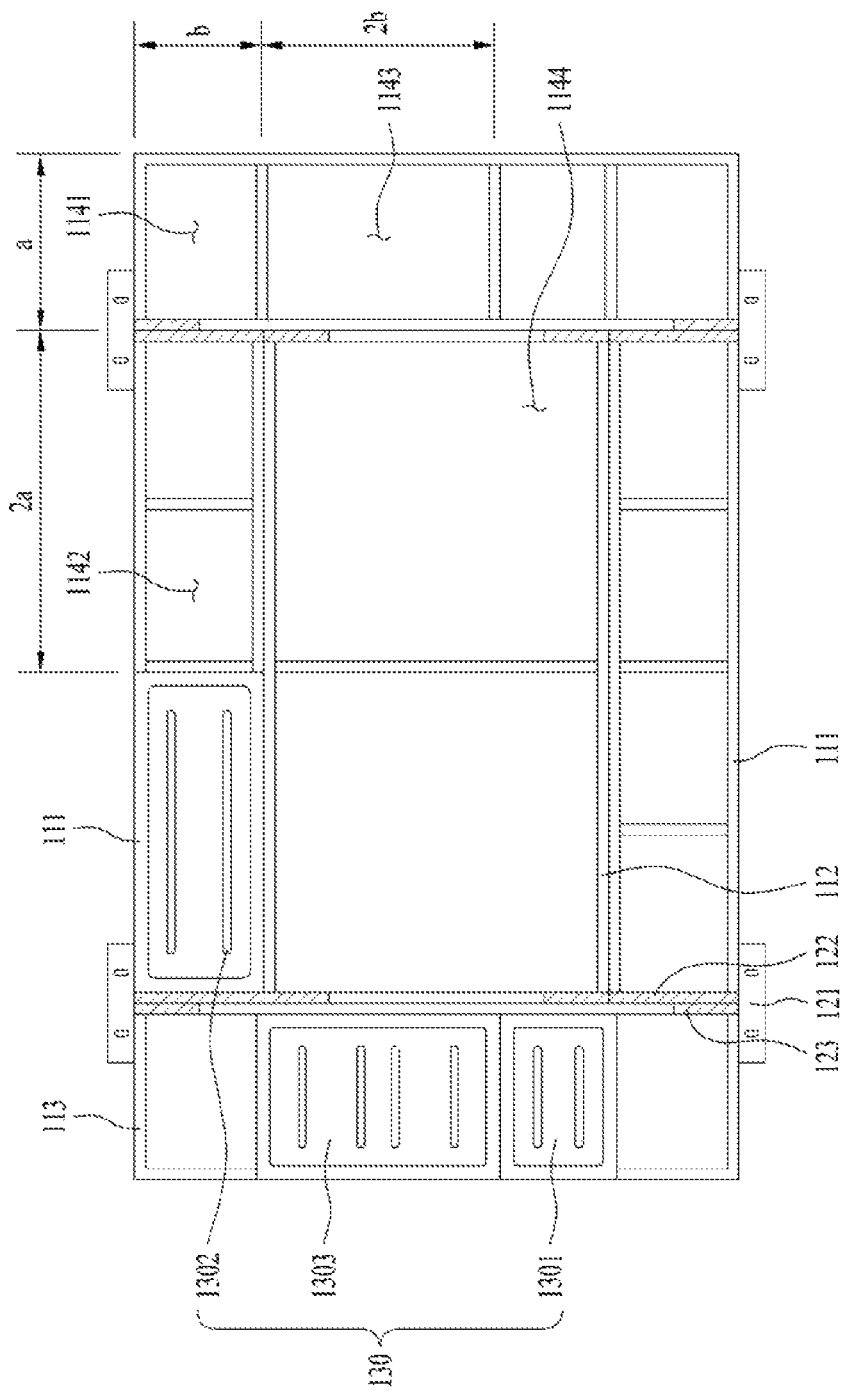
FIG. 8 is a view illustrating a basket of the smart wall according to an embodiment.

FIG. 8 is a view illustrating a basket 130 of the media wall 100 according to an embodiment of the present disclosure. The frame modules 111, 112, and 113 may be divided into a plurality of mounting cells 114 using the inner shape steel 115. As shown in FIG. 7, the basket 130 may be inserted into the mounting cells 114 to provide a space in which the electronic appliance 160 is seated. The second frame module 112 has a relatively large mounting cell 114 because the display device 161 is located therein. On the other hand, the mounting cells 114 of the first frame module 111 and the third frame module 113 may be formed to have standardized sizes. Using the mounting cells 114 of the standardized sizes, the basket 130 may also be standardized. Accordingly, there is no need to manufacture various different shapes of parts.

However, forming the mounting cells to have the same size may be favorable to standardization, but a larger cell may be needed depending on the electronic appliance 160 to be mounted. For example, since the size of the air conditioner is different from that of the air cleaner, the mounting cell 114 may be formed to have a size which is an integer multiple of a base size in consideration of the difference in size. For example, based on a first mounting cell 1141 having a horizontal dimension equal to a and a vertical dimension equal to b, a second mounting cell 1142 having a horizontal dimension equal to an integer multiple of a or a third mounting cell 1143 having a vertical dimension equal to an integer multiple of b may be provided.

The horizontal dimension of the first mounting cell 1141 corresponds to the horizontal dimension of the third frame module 113, and the vertical dimension thereof corresponds to the vertical dimension of the first frame module 111. Here, the mounting cell 114 refers to an internal space partitioned by the shape steel 115, and thus the difference in size between the first frame module 111 and the third frame module 113 caused by the thickness of the shape steel 115 is ignored.

Since the first frame module 111 has a short vertical length, the first frame module 111 may include only the first mounting cell 1141 and the second mounting cell 1142. Since the third frame module 113 has a short horizontal length, the third frame module 113 may include only the first mounting cell 1141 and the third mounting cell 1143.

Figure 9:
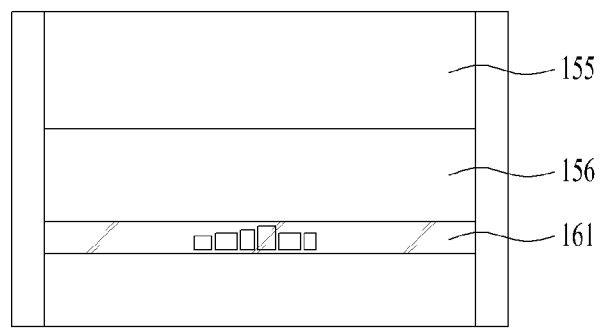
FIG. 9 is a view illustrating change of a screen view according to the size of a display exposed through the front of the smart wall according to an embodiment.
Figure 9:
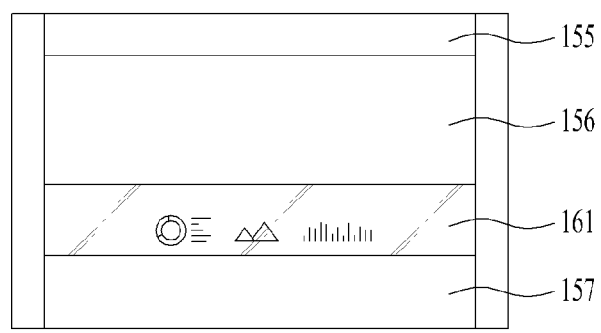
Figure 9:
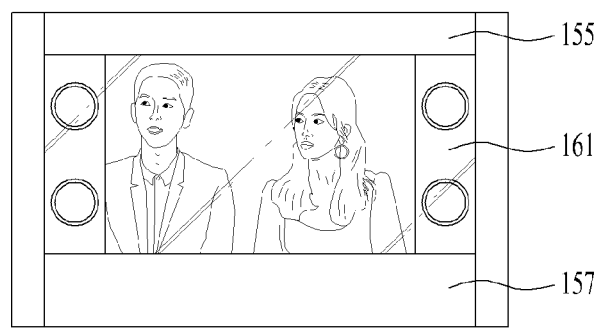

FIG. 9 is a view illustrating change of a screen view according to the size of a display exposed through the front of the smart wall 100 according to an embodiment. FIG. 9(a)

illustrates the smart wall in a line view mode and FIG. 9(b) illustrates the smart wall 100 in a half view mode. FIG. 9(c) illustrates the smart wall 100 in a full view mode.

The display device 161 may be used as a notification window for displaying a notification or the state of an electronic appliance mounted on the smart wall 100, rather than being used to display images. In this case, only a part of the display device 161, not the entirety of the display device 161, may be exposed to provide a tidy appearance in terms of aesthetics. As a part of the display device 161 is used, power consumption may be reduced.

The screen view output in the line view mode may provide a weather alarm, a notification of a water supply state of a humidifier, replacement of a filter of an air cleaner, a visitor notification, a notification of the amount of electricity used, and the like. In addition, when a user's command is recognized through a remote control or a voice, the output screen view may be varied based on the user's command. In the half view mode, the display device 161 is not fully used. However, when the amount of information to be provided to the user is large or when the speaker needs to be opened wider for listening to music, etc., the opening at the front may be further widened. In the full view mode, the entire display device 161 may be opened in a situation where the entire display device 161 should be utilized for watching a movie or TV.

Thus, the art wall at the front may be configured to be movable to provide screen views of the three modes. One of three modes may be determined based on the position to which the art wall 156, which is movable in a vertical direction, is moved. The media will may include an art wall 155 that is movable in a horizontal direction to provide a space required for the art wall 156 to move in the vertical direction. Hereinafter, the art wall movable in the horizontal direction is referred to as a first moving art wall 155, and the art wall movable in the vertical direction is referred to as a second moving art wall 156. A lower art wall 157 may be positioned under the display device 161. The lower art wall 157 may be fixed to the frame structure 110, and may be opened or closed according to an electronic device mounted on a lower side.

Figure 10:
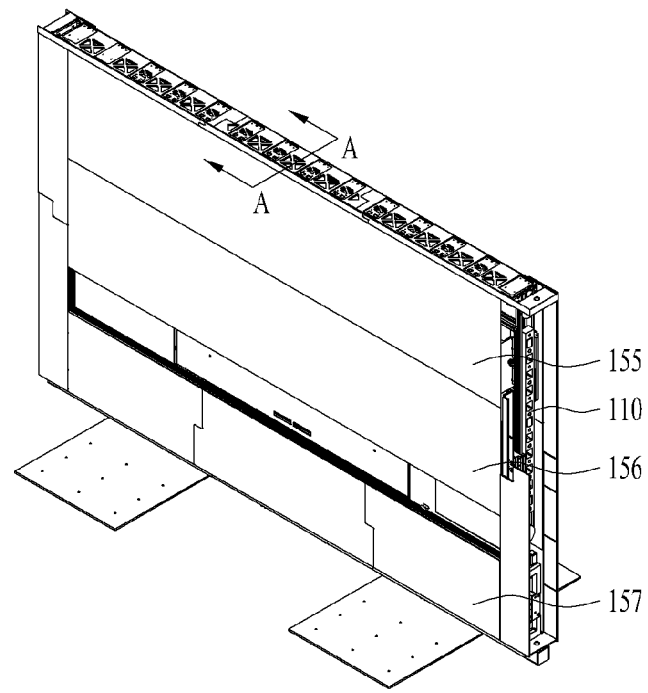
FIG. 10 is a view illustrating driving of moving art walls of the smart wall according to an embodiment.
Figure 10:
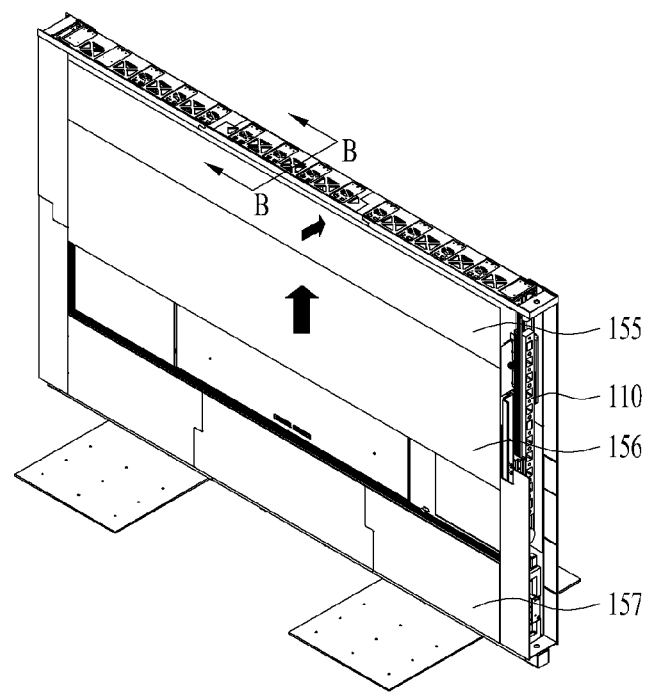
Figure 11:
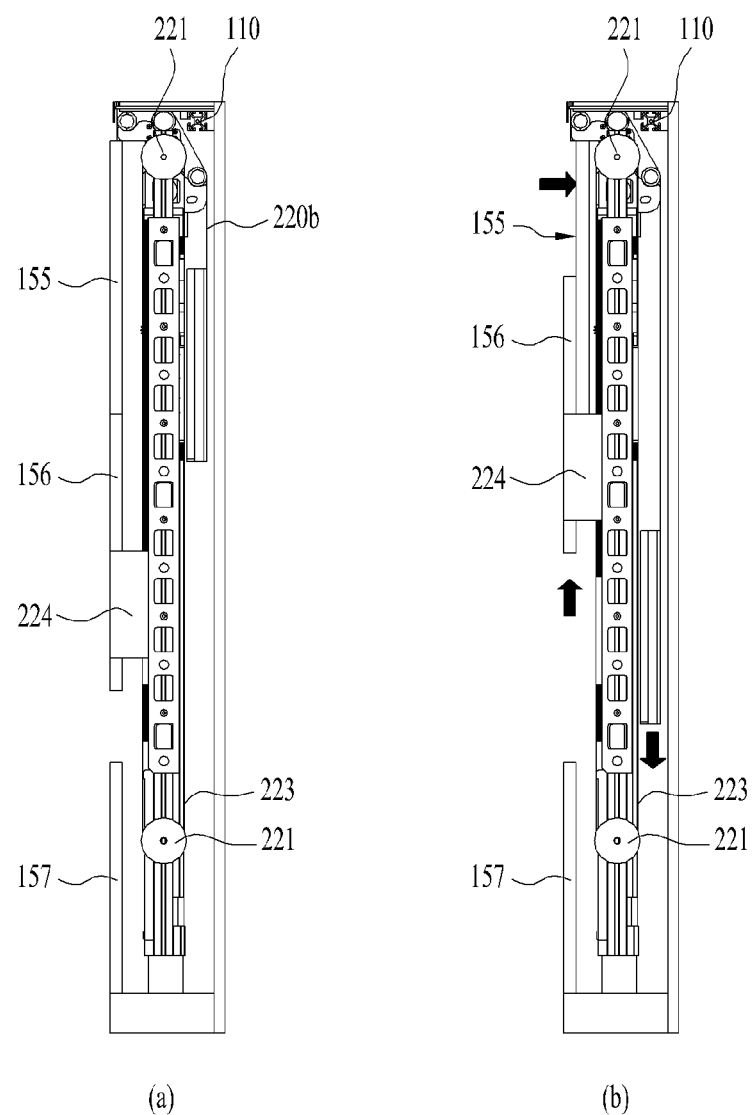
FIG. 11 is cross-sectional views taken along lines A-A and B-B of FIG. 10.

FIG. 10 is a view illustrating driving of moving art walls of the smart wall 100 according to an embodiment, and FIG. 11 is cross-sectional views taken along lines A-A and B-B of FIG. 10. FIGS. 10(a) and 11(a) illustrate arrangement of the first moving art wall 155 and the second moving art wall 156 in the line view mode, and FIGS. 10(b) and 11(b) illustrate arrangement of the first moving art wall 155 and the second moving art wall 156 in the half view mode.

In the line view mode, the front surfaces of the lower art wall, the first moving art wall 155 and the second moving art wall 156 may be arranged in the same plane, thereby providing a unified front appearance. When the smart wall is switched to the half view mode or the full view mode to increase the exposed area of the display device 161, the first art wall may move in a rearward direction to allow the second moving art wall 156 to move upward, as shown in FIG. 11(b). Only when the first moving art wall 155 moves a distance greater than or equal to the thickness of the second moving art wall 156 in the rearward direction, the second moving art wall 156 may be allowed to move across the front surface of the first moving art wall 155.

While the first moving art wall 155 is shown as one member in FIGS. 10 and 11, it may be divided into a lower first moving art wall 155 having a height corresponding to a distance that the second moving art wall 156 moves to provide the half view mode, and an upper first moving art wall 155 having a height corresponding to a distance that the second moving art wall 156 further moves from the position of the half view mode to provide the full view mode, as needed.

In this case, in the half view mode, the upper first moving art wall 155 may not move, and only the lower first moving art wall 155 may move in the rearward direction. Then, the second moving art wall 156 may move upward. In the full view mode, the upper first moving art wall 155 may also move in the rearward direction, and the second moving art wall 156 may further move upward to expose the entire display device 161.

Figure 12:
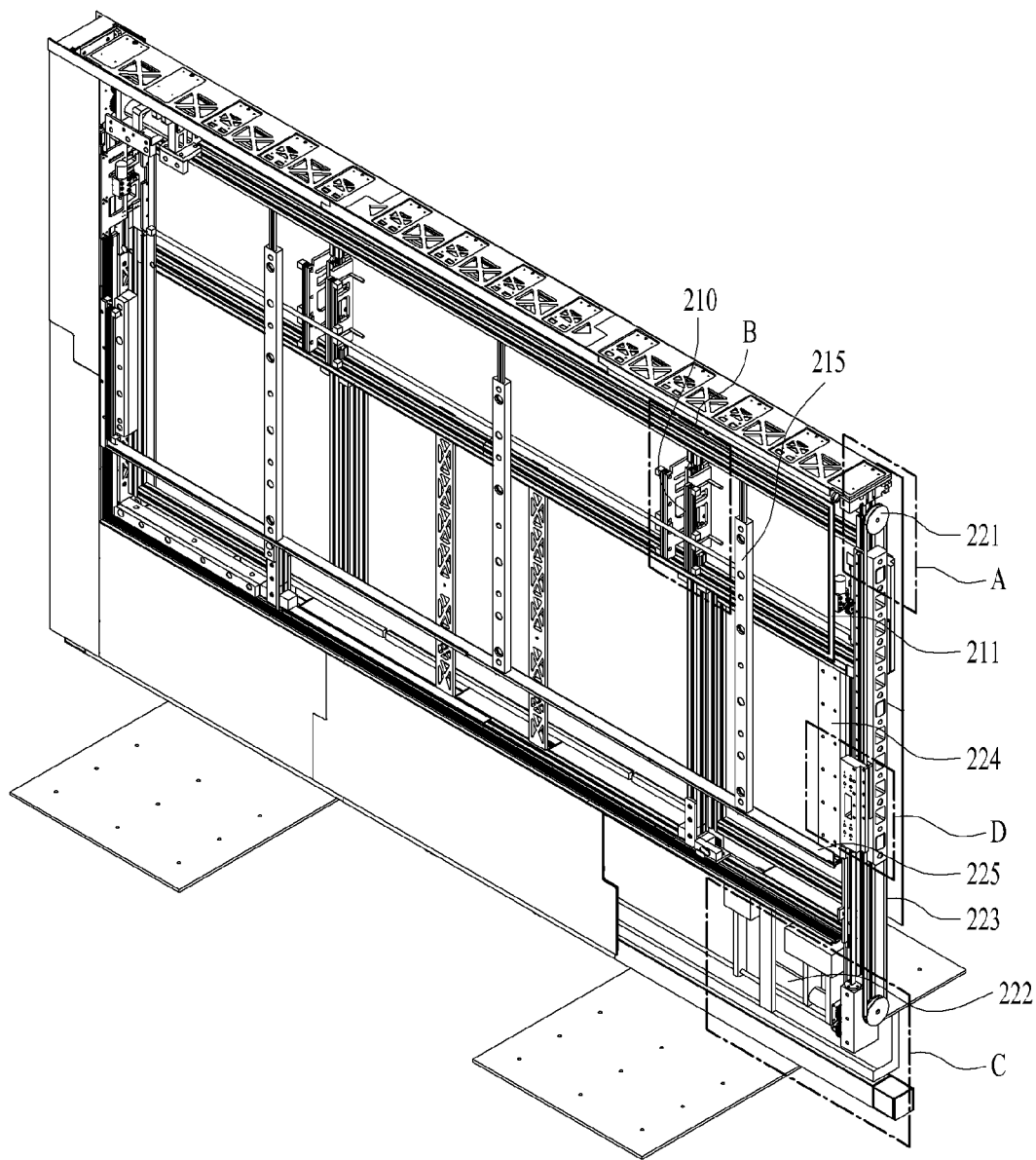
FIG. 12 is a view showing the moving art walls with art wall panel thereof removed.

FIG. 12 is a view showing the moving art walls 155 and 156 with art wall panel thereof removed. FIG. 12 shows a moving frame to which the art wall panels are coupled and a driver configured to provide driving force to the moving frame. Since the moving art walls 155 and 156 extend a long distance in the horizontal direction, a pair of drivers may be disposed on both left and right sides to prevent the moving art walls from being distorted in the horizontal direction.

Figure 13:
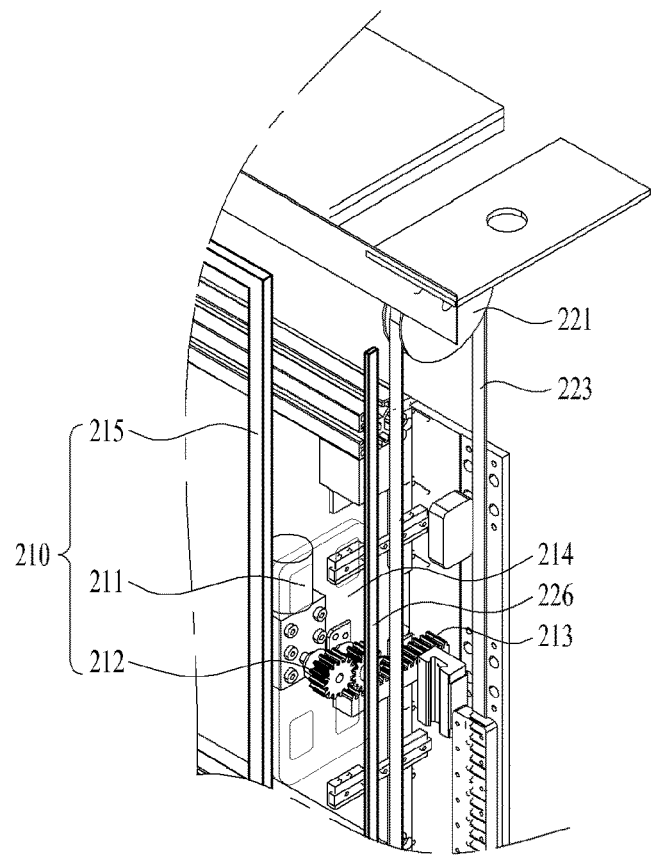
FIG. 13 is an enlarged view of portions A and B of FIG. 12.
Figure 13:
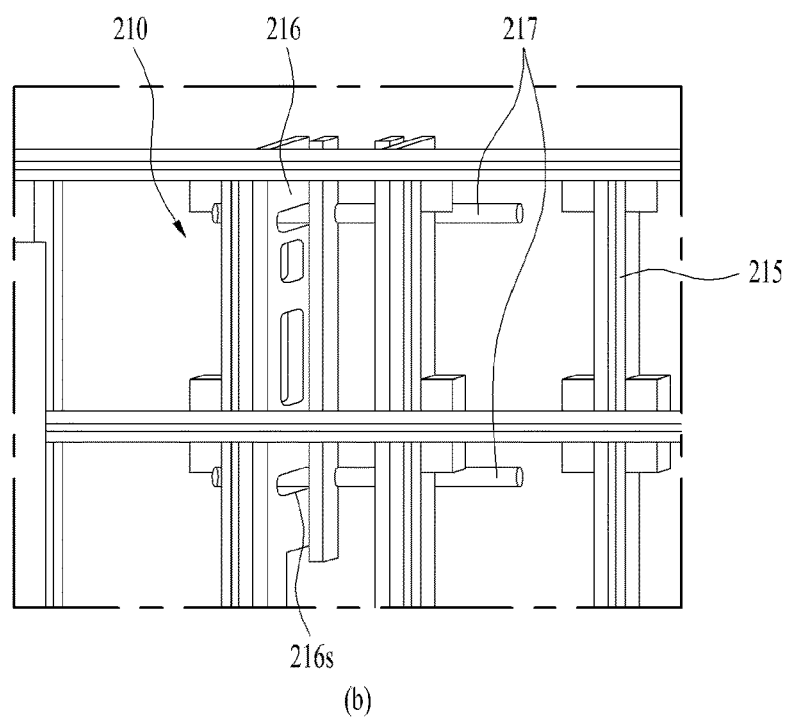

The first moving art wall 155 may include a first art wall panel and a first moving frame 215 arranged in a grid shape. The first art wall panel may be coupled to first moving frame 215. A horizontal driver 210 configured to drive the first moving art wall 155 in the back-and-forth direction may be positioned on left and right sides of the first moving frame 215. FIG. 13(a) is an enlarged view of portion A of FIG. 12, showing the horizontal driver 210. The horizontal driver 210 may be located symmetrically at the left end of the first moving frame as well. The horizontal driver 210 may include a first motor 211 fixed to the frame structure 110, a pinion gear 212 rotated by rotational force of the first motor 211 transmitted thereto, a rack gear 230 configured to move in a horizontal direction according to rotation of the pinion gear 212. The rack gear 213 converts a rotational movement of the pinion gear 212 into a horizontal movement in the back-and-forth direction to drive the first moving art wall 155.

The horizontal driver 210 may further include a first fastening bracket 214 coupled to the rack gear 213 and connected to the first moving frame 215. The first fastening bracket 214 may include a plate member extending in a front-back direction, and may also include a slot extending in the horizontal direction to allow a fixed member to be arranged through the first fastening bracket 214. For example, the first fastening bracket 214 may be positioned between the motor and the pinion gear 212. In this case, the slot extending in a horizontal direction may be formed at a position where the pinion gear 212 is connected to the motor at the first fastening bracket 214.

FIG. 13(b) is an enlarged view of portion B in FIG. 12. The first moving art wall 155 may further include a guide frame 216 provided with a guide slot 216s, and a guide pole 217. Even when the horizontal driver 210 is positioned at both ends of the first moving art wall 155, which is extended in the horizontal direction, the first moving art wall 155 may sag. The first moving art wall 155 may be supported so as not to sag by providing the guide frame 216 and the guide pole 217 in the middle thereof.

The guide slot 216s is formed in the guide frame 216 so as to extend the in the front-back direction. The guide pole 217, which is fixed to the frame structure 110, is arranged through the guide slot 216s. The guide pole 217 is a member extending in the horizontal direction and is inserted into the guide slot 216s to support the load of the first moving frame 215. In order to stably support the first moving frame 215, a plurality of guide frames 216 may be arranged spaced apart from each other in a horizontal direction. One guide pole 217 may be arranged through the guide slots 216s formed in the plurality of guide frames 216. In addition, a plurality of guide slots 216s may be formed in the guide frame 216 in the vertical direction, and the guide poles 217 spaced apart in the vertical direction may be arranged through the guide slots 216s.

Referring back to FIG. 12, the second moving frame 225, which is coupled to the rear surface of the second art panel, may be disposed in a grid shape under the first moving frame 215. The vertical driver 220 configured to drive the second moving frame 225 in the vertical direction may be disposed on the left and right sides of the second moving frame 225. The vertical driver 220 disposed on the left and right sides may be positioned horizontally outside the horizontal driver 210. The vertical driver 220 may be disposed outside the horizontal driver 210 such that the first moving art wall 155 and the second moving art wall 156 do not interfere with each other when the art walls overlap each other in the half view mode or the full view mode.

The vertical driver 220 may include a timing belt 223 configured to move in the vertical direction. The timing belt 223 may be disposed to form a closed curve surrounding the pair of rotating pulleys 221 disposed in the vertical direction. Since the timing belt 223 should be bendable, the timing belt may be formed of a flexible band or may be configured in a chain form.

Figure 14:
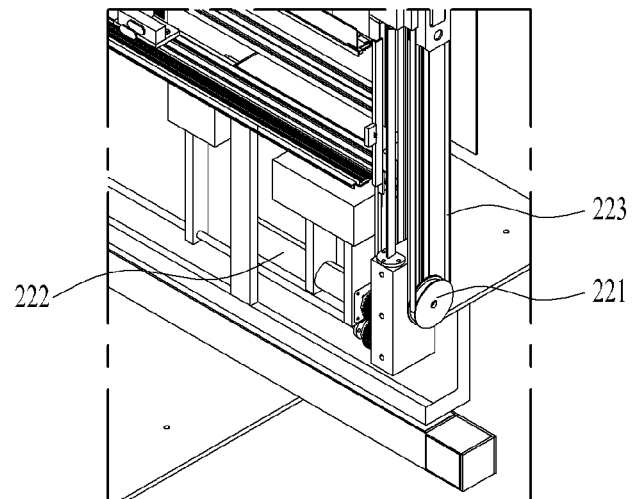
FIG. 14 is an enlarged view of portions C and D of FIG. 12.
Figure 14:
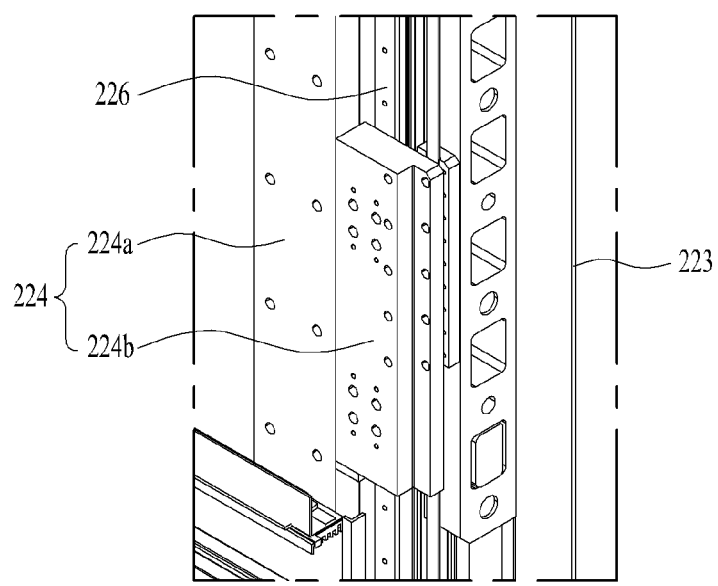

The second motor 222 that transmits rotational force to the rotating pulleys 221 may be fixed to the frame structure 110 and connected to one of the rotating pulley 221 located at the upper and lower sides. FIG. 14(a) is an enlarged view of portion C in FIG. 12, showing a second motor 222 connected to the rotating pulley 221 located on the lower side. In order to transmit the driving force of the second motor 222, a planetary gear may be provided between the motor 222 and the rotating pulley 221 to adjust a reduction ratio.

Figure 15:
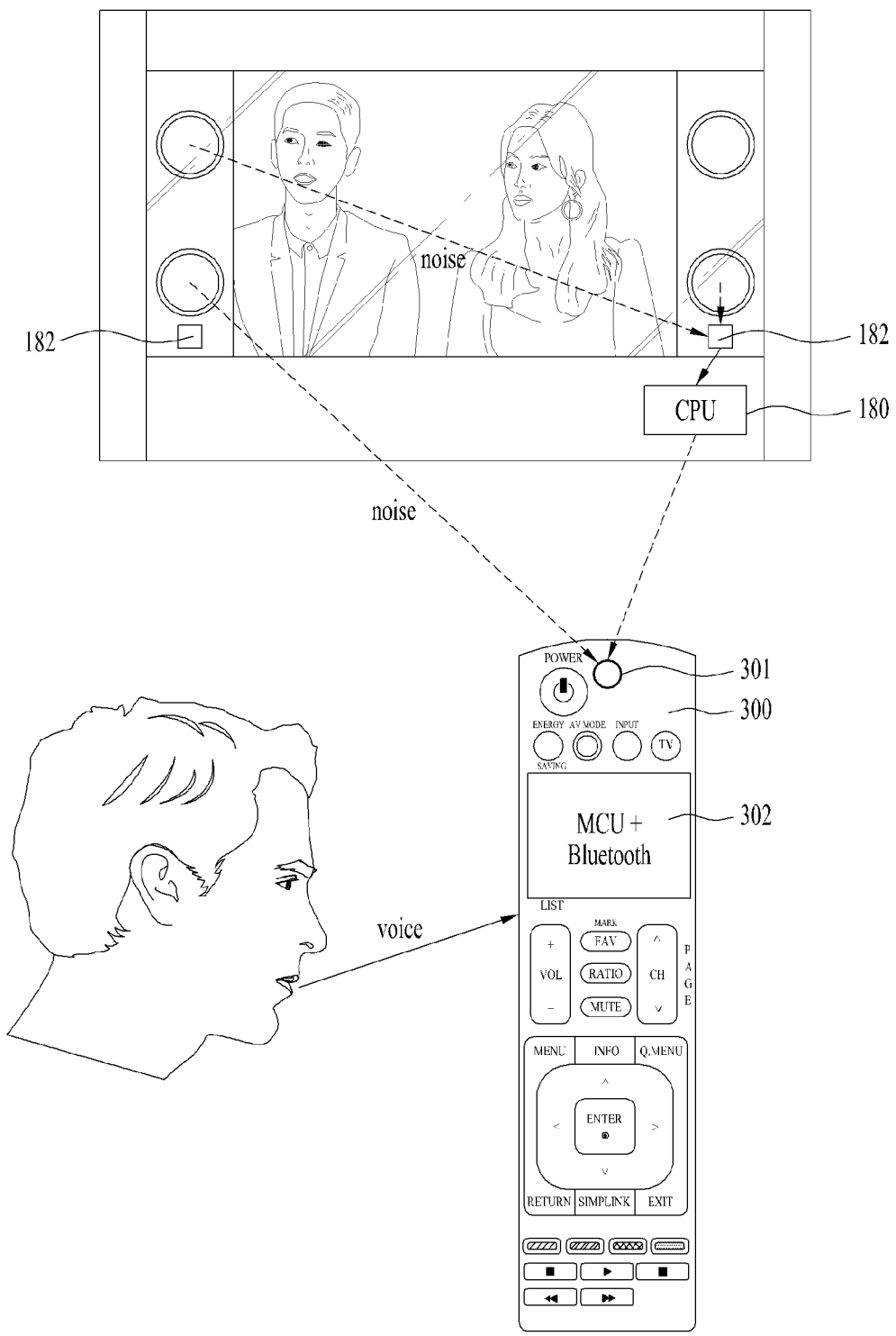
FIG. 15 is a conceptual diagram illustrating a method of controlling the smart wall using a remote controller.
Figure 16:
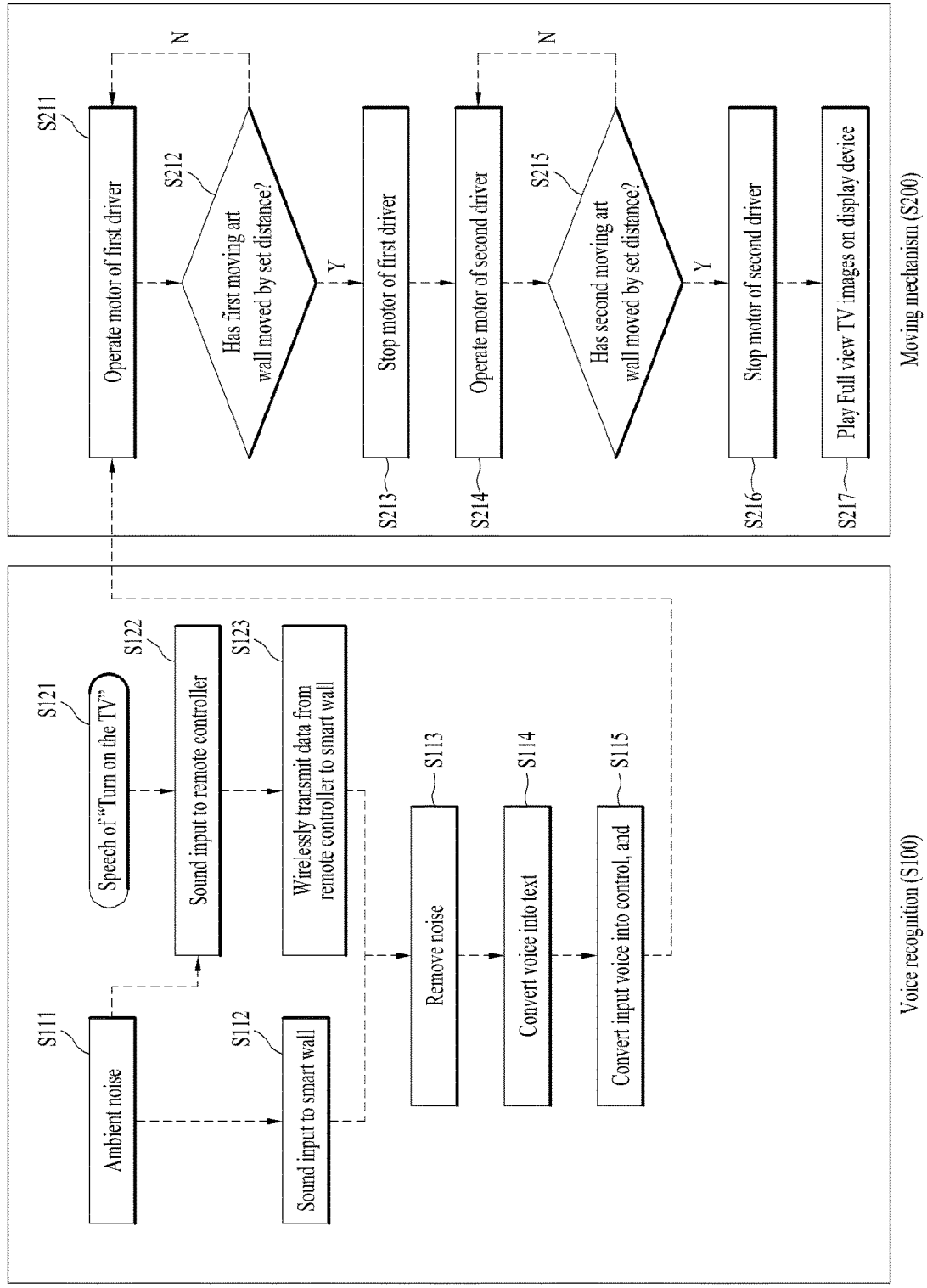
FIG. 16 is a flowchart illustrating operation of the smart wall of the present disclosure.

A second fastening bracket 224 configured to fasten the timing belt 223 and the second moving frame 225 may be disposed to extend in the vertical direction to support the load of the second frame. The second fastening bracket 224 may be formed of a wide plate-shaped member. When the load of the second moving art wall 156 is supported by the timing belt 223 along, the rotating pulley 221 and the timing belt 223 may be broken. Therefore, a guide rail 226 and a guide roller (not shown) may be provided to support the load of the second moving art wall 156 and guide vertical driving of the second moving art wall. The guide rail 226 may be a member extending on the frame structure 110 in the vertical direction and may be disposed adjacent to the timing belt 223. The guide roller moving along the guide rail 226 may be coupled to the second fastening bracket 224 to assist the vertical movement of the second moving art wall 156. The second moving art wall 156 may be supported by the frictional force between the guide rail 226 and the guide roller. A fixing part to fix the guide roller in the half view mode and the full view mode may be further provided. FIG. 15 is a conceptual diagram illustrating a method of controlling 100 using a remote controller 300, and FIG. 16 is a flowchart illustrating operation of the smart wall 100 of the present disclosure. The smart wall 100 may include a microphone 182. Since the smart wall 100 is wide, the smart wall 100 may include a plurality of microphones 182. The microphone 182 included in the smart wall 100 detects a user's voice, and the controller 180 recognizes the user's voice and converts the user's voice into a control command. According to the control command, various electronic appliances mounted in the smart wall 100 may be controlled. Driving of the display device 161 and the moving art walls positioned in front of the display device 161 may be controlled.

The microphone 182 provided in the smart wall 100 may recognize the user's voice. However, louder sound output through the loudspeaker 162 may be input to the microphone 182, and thus it may be difficult to recognize the user's voice. To address this issue, a separate microphone 301 is provided on the remote controller 300. Thus, the user's voice may be correctly recognized based on the sound recognized through the microphone 301 provided to the remote controller 300 and the sound input to the microphone 182 mounted in the smart wall 100. Specifically, the sound information input through the microphone 301 disposed in the remote controller 300 may be wirelessly transmitted to the controller 180 mounted in the smart wall 100. The controller 180 may remove the noise and accurately extract the user's voice by comparing the received sound information with the sound information collected from the microphone 182 of the smart wall 100. To implement this control operation, the remote controller 300 may include a controller and a wireless communicator 302.

Hereinafter, the method of driving the moving art walls and controlling the display device 161 through user voice recognition will be described in detail with reference to FIG. 16. The method illustrated in FIG. 16 is brotherly divided into voice recognition (S100) of recognizing the user's voice and a driving mechanism (S200). The voice recognition (S100) of recognizing the voice of the user will be described in detail first. The ambient noise (S11) may be input into the microphone of the smart wall 100 (S112) or input into the microphone of the remote controller 300 (S122). The user's speech (S121) is input through the microphone of the remote controller 300 (S122). The data collected by the remote controller 300 may be transmitted to the controller 180 of the smart wall 100 (S123). The controller 180 may remove noise by combining the sound collected through the microphone of the smart wall 100 and the sound from the remote controller 300 (S113). That is, the sound corresponding to the noise collected by the smart wall 100 may be removed while leaving only the user's speech of "Turn on the TV" the among the sound data input through the remote controller 300. The user's voice from which the noise is removed is converted into a text (S114), and the driver is operated when the text matches a preset control command (S115).

When the motors of the first moving art wall 155 operates, the first moving art wall 155 moves in the rearward direction (S211). When the first moving art wall 155 moves by a set distance, the motor of the first driver is stopped to stop the operation of the first moving art wall 155 (S212 and S213). The motor of the second driver of the second moving art wall 156 is operated to move the second moving art wall 156 upward (S214). When the second moving art wall 156 moves by a set distance (S215) and thus the display device 161 is exposed, the motor of the second driver is stopped to stop the operation of the second moving art wall 156 (S216). The controller 180 may control the display device 161 to operate in a full view mode in which images are output through the entire display device 161 to allow the user to watch TV (S217).

In the half view mode, the second moving art wall 156 is partially moved, and the image output to the display device 161 is displayed on a part of the display device 161 that is not covered by the second moving art wall 156. In the line view mode, the above-described operation may be reversely performed to expose only a part of the display device 161.

As is apparent from the above, the smart wall 100 may be equipped with multimedia devices, such as a display device and an audio devices, and household appliances, such as an air cleaner and a humidifier, on a wall, thereby minimizing the exposure of the home appliances.

In addition, a device occupying a large area such as the display device 161 may be selectively opened as needed. Thereby, a tidier appearance may be provided.

The art wall to cover the display device 161 may provide the same appearance as the other art walls, and accordingly may provide a unified appearance even when partially opened.

The above embodiments should be construed in all aspects as illustrative and not restrictive. The scope of the disclosure should be determined by the appended claims and their legal equivalents, and all changes coming within the meaning and equivalency range of the appended claims are intended to be embraced therein.

What is claimed is:

1. A smart wall comprising:
   a frame structure comprising a mounting cell;
   an electronic appliance disposed in the mounting cell;
   a first moving art wall positioned in an upper front portion of the mounting cell;
   a second moving art wall positioned in a lower front portion of the mounting cell;
   a horizontal driver configured to drive the first moving art wall in a frontward or rearward direction with respect to the smart wall; and
   a vertical driver configured to drive the second moving art wall in an upward or downward direction of the smart wall, wherein the first moving art wall and the second moving art wall are arranged in a vertical orientation with respect to the smart wall and formed in a same plane in front of the smart wall in a first mode and the first moving art wall overlaps the second moving art wall in the rearward direction with respect to the smart wall in a second mode.

2. The smart wall of claim 1, wherein the horizontal driver and the vertical driver is disposed in pairs on left and right sides of the frame structure,
   wherein the horizontal driver is arranged at a shorter distance from a center of the frame structure than the vertical driver.

3. The smart wall of claim 1, wherein the first moving art wall comprises:
   a first art wall panel arranged in front of the frame structure so as to be exposed; and
   a first moving frame coupled to a rear surface of the first art wall panel and configured to transmit force of the horizontal driver.

4. The smart wall of claim 3, wherein the horizontal driver comprises:
   a first motor fixed to the frame structure;
   a pinion gear configured to be rotated by rotational force of the first motor transmitted thereto;
   a rack gear configured to move horizontally according to rotation of the pinion gear; and
   a first fastening bracket configured to connect the first moving frame and the rack gear to each other.

5. The smart wall of claim 3, further comprising:
   a guide frame extending in a rear direction of the first moving frame;
   a guide slot formed in the guide frame and extending in a front-back direction; and
   a guide pole fixed to the frame structure and inserted into the guide slot,
   wherein, when the first moving art wall moves in a frontward and rearward direction, a position of the guide pole is changed in the guide slot.

6. The smart wall of claim 5, wherein the guide frame comprises a plurality of guide frames arranged in a horizontal direction of the first moving art wall,
   wherein the guide pole extends in a horizontal direction to pass through the guide slots formed in the plurality of guide frames.

7. The smart wall of claim 5, wherein the guide slot and the guide pole comprise a plurality of guide slots and guide poles arranged in a vertical direction on the guide frame.

8. The smart wall of claim 1, wherein the second moving art wall comprises:
   a second art wall panel arranged in front of the frame structure so as to be exposed; and
   a second moving frame coupled to a rear surface of the second art wall panel and configured to transmit force of the vertical driver.

9. The smart wall of claim 8, wherein the vertical driver comprises:
   a pair of rotating pulleys coupled to the frame structure and disposed in a vertical direction;
   a second motor configured to provide rotational force to the pair of rotational pulleys;
   a timing belt having a closed curved surface surrounding the pair of rotating pulleys; and
   a second fastening bracket configured to connect the second moving frame and the timing belt.

10. The smart wall of claim 9, further comprising:
    a guide rail disposed adjacent to the timing belt and extending in a vertical direction; and
    a guide roller protruding from the second fastening bracket and fastened to the guide rail so as to move in the vertical direction.

11. The smart wall of claim 1, wherein the first moving art wall is moved by a distance greater than or equal to a thickness of the second moving art wall.

12. The smart wall of claim 1, further comprising:
    a controller configured to drive the second moving art wall after completion of driving of the first moving art wall when an open driving signal is input,
    wherein the electronic appliance comprises a display device,
    wherein the controller changes a size and content of an image output to the display device according to a position of the second moving art wall.

* * * * *